Oct. 21, 1930.                L. CONSTANTIN                1,778,794
                              WINDMILL REGULATOR
                              Filed April 5, 1929
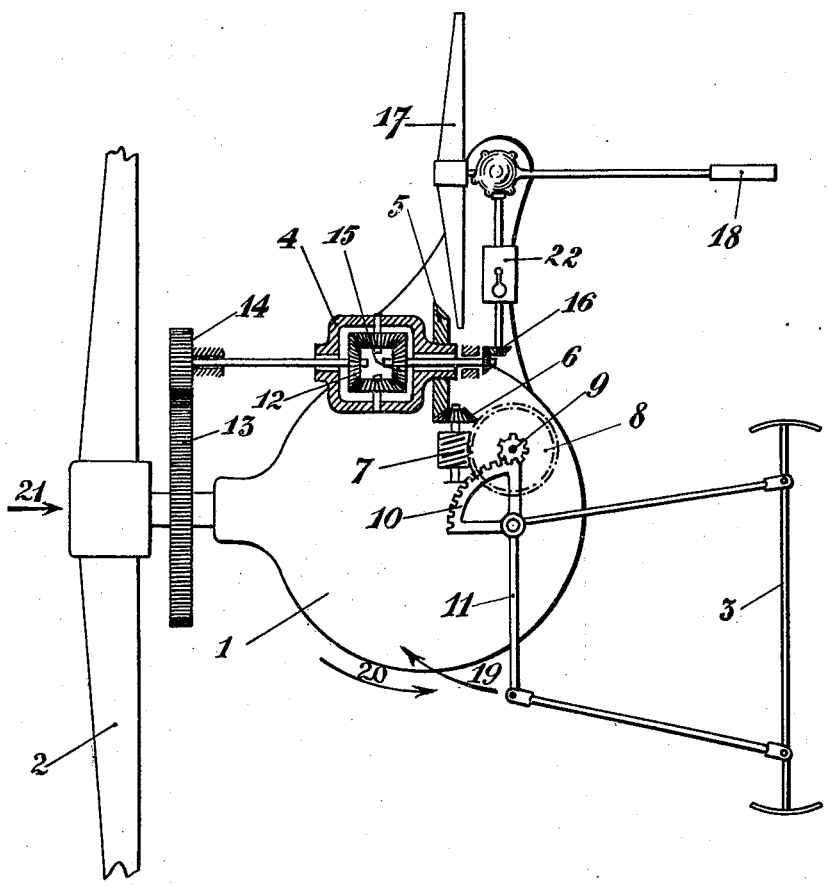
Inventor:
Louis Constantin
By Mauro & Lewis
Attorneys Patented Oct. 21, 1930

1,778,794

UNITED STATES PATENT OFFICE

LOUIS CONSTANTIN, OF PARIS, FRANCE, ASSIGNOR OF ONE-HALF TO PAUL FORTIER-BEAULIEU, OF ROANNE, LOIRE, FRANCE

WINDMILL REGULATOR

Application filed April 5, 1929, Serial No. 352,693, and in France April 11, 1928.

The present invention has for an object a new system of regulation of wind motors which is constituted in such a way that the partial disappearing of said wind motors is produced progressively and automatically, either as a function of the load of the utilization expedients turning at speeds proportional to those of the wind, or in a way to preserve a constant speed of the driving arbor whatever be the load.

In my U. S. patent application No. 240,500 of December 16, 1927, I disclosed an orienting and disappearing device for wind motors utilizing the combined action of an auxiliary biasing servo-motor, a windvane preferably of the Constantin type of U. S. patent application No. 512,367 filed November 2, 1921, and a disappearing blade maintained by a spring or counter-weights.

In the U. S. Patent No. 1,672,152 taken in my name, it is a question moreover of making use of a differential organ for the regulation of the load on the utilization apparatuses as a function of the biasing power available.

The system of regulation forming the subject matter of the present invention allows, at the same time as the suppression of the disappearing blade, a disappearing which is progressive and automatic in connection with the wind motor of predetermined amplitude and strictly sufficient in order that the motor furnish exactly either the demand of power by the utilization apparatus for turning proportionally to the speed of the wind, or a power such that these utilization apparatuses operate at constant speed whatever be their load. This is of course with the assumption that the same takes place within the limits of the biasing power available.

This system is constituted essentially by the combination with an auxiliary biasing servo-motor, which could be also replaced by a motor of any other constant speed type, a windvane of the Constantin type preferably controlling in known manner the orientation of the movable head of the wind motor, and of a differential organ which regulates the displacement of the orienting windvane and, according to the sign of the difference between the speed of rotation of the wind motor and that of the biaser, causes through the medium of the windvane the rotation of the movable head of the wind motor in one direction or the other, in a way to obtain the desired power.

In other words, if the speed of the wind motor is greater than that of the auxiliary servo-motor, i. e., if the difference between the speeds is positive, the auxiliary servo-motor causes the rotation of the movable head of the wind motor in one direction; if, on the contrary, the speed of the wind motor is less than that of the auxiliary servo-motor, i. e., if the difference between the speeds is negative, the auxiliary servo-motor causes the rotation of the movable head of the wind motor in the opposite direction.

One of the results which my improved system attains is that, in very high winds, the wind motor will almost completely disappear, but still continue to furnish exactly the power required.

Another result is that if the apparatuses being utilized are disconnected, the motor will stop automatically itself, up to the point where it furnishes more than the power necessary to overcome friction which opposes its rotation under no load at a speed proportional to the wind.

The invention will be more readily understood in the following description taken in connection with the accompanying drawing forming part of this specification.

The single figure of the drawing is a conventional view in plan of the regulating system forming the object of my invention.

Referring to the drawing more in detail, 1 designates the movable head containing the mechanism for transmitting the energy furnished by the wind motor 2. Said movable head is orientable by means of a suitable mechanism, not illustrated, controlled itself by the windvane 3 in accordance with a known arrangement such as that disclosed in patent application No. 240,500 above mentioned. Said windvane 3 comprises two blades or orienting surfaces $3_a$ symmetrically disposed at the ends of the major base of an articulated trapezoid. At 4 is shown a differential which, through the medium of the bevelled gear 5, pinion 6, tangent screw 7, wheel 8, pinion 9 and toothed sector 10, controls the displacement of the base 11 of the windvane 3 with respect to the movable head.

The pinion 12 of the differential receives its movement from the wind motor through the medium of the toothed wheels 13 and 14.

The pinion 15 of the differential has movement imparted to it by means of a gear train 16 from the auxiliary biaser 17 carried by the movable head 1, and always correctly oriented by any suitable means such as a rudder 18.

As is known if the two pinions 12 and 15 turn at the same speed and in opposite directions, the differential remains stationary. If it be assumed that the transmissions be calculated in such a way that the whole will operate at full load, the position of all the members being that in the drawing and the wind blowing in the direction of the arrow 21, the differential remains stationary. This means that the wind motor will operate under optomistic conditions and furnish all the power resulting from the actual speed of the wind.

But if it is assumed now that the speed of the wind increases, the speed of the biaser 17 increases, which operates very nearly at no load, and consequently that of pinion 5, increases proportionally. But that of pinion 12 increases more quickly still since the load remaining constant and the power of the biaser increasing as the cube of the speed of the wind, the wind motor 2 tends to race. The differential is therefor brought into movement and, if the directions of rotation have been suitably chosen, the displacing bar 11 of the windvane will be put in motion in the direction of the arrow 19.

This displacing of the windvane, as is known, causes a disappearing of the movable head in the direction of the arrow 20 by swinging for example the housing of an auxiliary winch normally parallel to the direction of the wind and by placing the said winch opposite to the wind as described and claimed in my copending application No. 240,500, filed December 16, 1927. The auxiliary winch is then placed in rotation by the wind and produces through the medium of idle gears disposed as described in the patent application just mentioned a rotation, that is to say a disappearing of the wind motor. For the purposes of simplification, the winch and the gear trains associated therewith which are known in the art have not been illustrated in the drawing. Following the disappearing the speed of the wind motor diminishes and the equilibrium becomes established when the speed of pinion 12 is equal to that of pinion 15. At this moment, the displacing bar 11 which has followed the movement of the movable head in the direction of the arrow 20 contrary to its displacing movement in the direction of the arrow 19, will again be perpendicular to the direction of the wind shown by arrow 21.

A disappearing entirely analogous and following the same operations is produced, if the load is disconnected.

At any new wind speed and at any new load by the utilization apparatuses corresponds a displacing movement of the bar 11 and a new position of equilibrium of the speeds, that is, a new orientation position.

It will be well to note the following points of interest:

The utilization apparatuses controlled by the wind motors are very frequently piston pumps, rotary pumps, pulley driven, worm driven or the like, whose load increases proportionally, very nearly with the speed. They may also be centrifugal pumps whose load increases proportionally as the cube of the speed. Finally they may be electric generators whose load depends both upon the line which they feed and the type of windings employed. In all the various examples the orientation takes place in such wise that the wind motor will furnish exactly the power necessary for the utilizing organs functioning always at a speed proportional to that of the wind. But in no case is racing produced.

Thus if the utilizing organs are disconnected, the disorientation will be such that the wind motor furnishes exactly the power necessary for causing it to turn at no load at the speed corresponding to full load, but no longer furnishes power.

It is to be understood that the auxiliary biaser could be the same as that which serves as an orienting servo-motor provided that the latter is furnished with an efficient device suitable for orientation.

If this biaser be replaced by a constant speed motor such as an electric alternating current motor fed by a source of constant frequency, for example, it is evident that whatever be the load and be it understood within the limits of the power of the biaser which is available, the disorientation is produced in such wise that the speed of the wind motor remains constant.

A speed box 22 connected in the transmission between the differential and the auxiliary motor allows the wind motor to be turned at different speeds according to the needs, but always constant.

The transmissions indicated in my present device may obviously be replaced by their equivalents.

The windvane arrangement of the Constantin type could, although with less precision than such type in operation, be any other sort of windvane.

Having described my invention what I claim as new and desire to secure by Letters Patent is:

1. A regulating system for wind motors comprising in combination with such wind motor, an auxiliary servo-motor, a windvane, means cooperating with said windvane for producing orientation of said wind motor, and a differential adapted to regulate the displacement of the windvane in one direction or the other in accordance with the algebraic sign of the difference between the speed of rotation of the wind motor and that of the auxiliary servo-motor.

2. A regulating system for wind motors comprising in combination with such wind motor, an auxiliary servo-motor, a windvane consisting of a pivoted lever quadrilateral and a pair of blades carried thereby, means cooperating with said windvane for producing orientation of said wind motor, and a differential adapted to regulate the displacement of the windvane in one direction or the other in accordance with the algebraic sign of the difference between the speed of rotation of the wind motor and that of the auxiliary servo-motor.

3. A regulating system for wind motors comprising in combination with such wind motor, an auxiliary wind motor, a windvane, means cooperating with said windvane for producing orientation of said wind motor, and a differential adapted to regulate the displacement of the windvane in one direction or the other in accordance with the algebraic sign of the difference between the speed of rotation of the wind motor and that of the auxiliary wind motor.

4. A regulating system for wind motors comprising in combination with such wind motor, an auxiliary wind motor, a windvane consisting of a pivoted lever quadrilateral and a pair of blades carried thereby, means cooperating with said windvane for producing orientation of said wind motor, and a differential adapted to regulate the displacement of the windvane in one direction or the other in accordance with the algebraic sign of the difference between the speed of rotation of the wind motor and that of the auxiliary wind motor.

In testimony whereof I have signed this specification.

LOUIS CONSTANTIN.